EARL E. McREYNOLDS
INVENTOR.

EARL E. McREYNOLDS
INVENTOR.

BY Dennis A Lith
AGENT

March 17, 1970  E. E. McREYNOLDS  3,500,893
FALLING FILM EVAPORATOR
Filed March 8, 1968  4 Sheets-Sheet 3

EARL E. McREYNOLDS
INVENTOR.

BY Denis A. Firth.
AGENT

March 17, 1970  E. E. McREYNOLDS  3,500,893
FALLING FILM EVAPORATOR

Filed March 8, 1968  4 Sheets-Sheet 4

EARL E. McREYNOLDS
INVENTOR.

BY Denis A Lith

AGENT.

United States Patent Office 3,500,893
Patented Mar. 17, 1970

3,500,893
FALLING FILM EVAPORATOR
Earl E. McReynolds, La Porte, Tex., assignor to The Upjohn Company, Kalamazoo, Mich., a corporation of Delaware
Filed Mar. 8, 1968, Ser. No. 711,540
Int. Cl. B01d 1/22
U.S. Cl. 159—13      5 Claims

ABSTRACT OF THE DISCLOSURE

A falling film evaporator, heater or vaporizer, is provided in which the liquid feed is caused to flow downwardly over a series of heated "globular" (spherical, frustoconical, cylindrical, ellipsoidal or other spheroidal) surfaces each of which is separated from its neighbors by a vertical connecting surface. After passage over each "globular" surface, the liquid passes down the said vertical connecting surface and is collected and redistributed over the next "globular" surface. The arrangement of alternating "globular" and vertical connecting surfaces provides an alternating stretching and compressing of the liquid film in its downward travel and thereby causes turbulence in the film surface. This facilitates escape of volatile material from the down flowing film. Advantages of the apparatus include low unit cost, simplicity of construction and of cleaning and maintenance, and smaller temperature difference between heating surface and film which results in less degradation of material. Additionally, the completely free escape area of the volatile vapors provides practically zero pressure drop allowing lower pressure and thus lower temperature for the evaporation process for a given vacuum source, again resulting in less degradation of heat sensitive materials.

BACKGROUND OF THE INVENTION

Field of the invention

This invention relates to improved falling film heaters or evaporators (hereinafter called "evaporators") in which volatile constituents are to be removed from a relatively non-volatile liquid, and is more particularly concerned with falling film evaporators for use in the stripping of volatile solvents, optionally under reduced pressure, from relatively non-volatile solutes in which it is desirable to minimize the time-temperature exposure of the materials without resort to mechanically agitated films.

Description of the prior art

A large number of falling film evaporators are known in the art. In such devices the film of liquid feed material is falling under gravity over a heated surface. Such devices hitherto known suffer from a number of inherent disadvantages, particularly when the liquid feed material is one which tends to deposit solid or gummy material during passage through the column. For example, when the liquid feed material is a solvent solution of a polyisocyanate which has been obtained by phosgenation of the corresponding amine, said feed shows a tendency to deposit solid or gummy materials during solvent stripping in conventional evaporators. Such deposition tends to foul the surface over which the liquid flows. Surface fouling also occurs due to degradation of material in the falling film particularly where high film temperatures (necessitated by lack of film turbulence, large pressure drops and the like) have to be employed to remove volatile material. Such fouling necessitates undesirably frequent cleaning of the interior of the evaporator. Further, the aforesaid prior art devices are also subject to the disadvantaged that fabrication costs are high and complicated means are necessary to heat the surfaces over which the liquid is flowing. In some cases, it is necessary to use low pressure heating media such as heating oils and the like, since the geometry of the evaporator surfaces precludes the use of the more economical high pressure steam.

I have now found that it is possible to accomplish the separation of volatiles from heat sensitive liquids in a falling film evaporator and to avoid the difficulties hitherto encountered in handling materials which are liable to cause surface fouling upon heating during passage through the apparatus. Further, I have found that this result can be accomplished in a simple and novel manner which permits the downwardly-flowing liquid to pass over a variety of surfaces of changing contour all of which can be heated in a simple and economical manner. The novel device is of simple construction and can be readily cleaned, dismantled, modified, and maintained.

SUMMARY OF THE INVENTION

This invention consists of a novel falling film evaporator which comprises in combination:
 (i) An outer hollow shell having its longitudinal axis substantially vertically disposed;
 (ii) A liquid feed inlet disposed in the upper end of said outer shell;
 (iii) A hollow film heating element disposed within the said outer shell and comprising a plurality of hollow globular members mounted one above the other substantially vertically within said outer shell, the interior of each of said globular members being connected with the interior of each of its neighbors by hollow connecting members having substantially vertical exterior walls;
 (iv) Means disposed above the uppermost of said hollow globular members for receiving liquid from said liquid inlet in the upper end of said outer shell and distributing said liquid on the upper surface of said uppermost hollow sphere;
 (v) A plurality of distributor weirs disposed coaxially with, and surrounding, the lower end of each of said hollow connecting members;
 (vi) Means for heating the interior of the said hollow globular members and hollow connecting members;
 (vii) Means for removing volatile overhead from the upper end of said outer shell; and
 (viii) Means for removing undistilled fluid bottoms from the lower end of said outer shell.

DETAILED DESCRIPTION OF THE INVENTION

Figure 1:
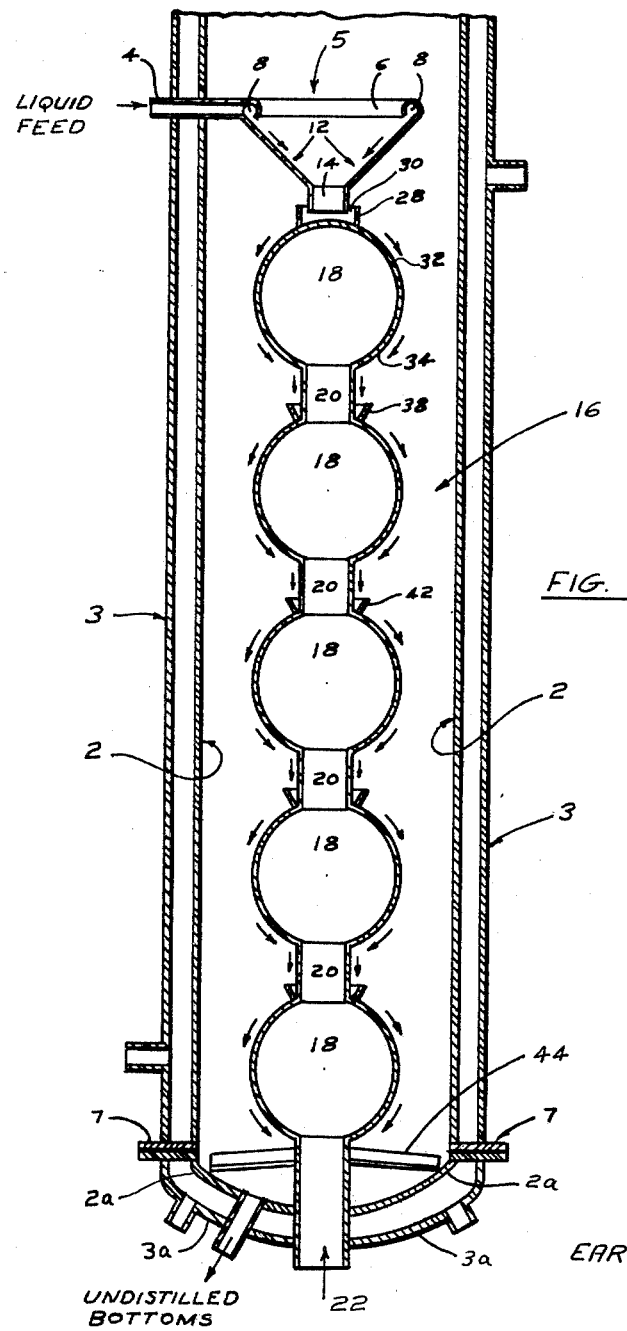
FIGURE 1 is a cross-sectional view taken along the vertical axis of a specific embodiment of a falling film evaporator according to the invention.

Falling film evaporators normally comprise an outer housing, which is usually cylindrical in shape, means for introducing liquid feed stock in the upper part of the column, means for removing volatile materials overhead, means for removing undistilled liquid from the bottom of the outer housing, and means for conducting the liquid feed downwardly. The novel feature of the falling film evaporator of the invention resides in the particular design of the means for conducting the liquid feed downwardly, with alternate stretching and shrinking of the liquid film, over a film-heating surface. The film turbulence caused by repeated stretching and shrinking of the film permits ready escape of volatile material therefrom.

The novel film-heating element comprises a hollow member projecting upwardly from the base of the outer housing. Advantageously, said base is detachable from the main body of the housing so that the hollow member can be removed readily from the housing for inspection and servicing. The external configuration of said hollow member is such that the downwardly-flowing liquid film passes over a large, heated surface area the contours of which are constantly changing. Incorporated with the liquid film-heating element are means placed at intervals in the downward passage of the film such that the liquid is collected and redistributed over the next lower surface. The liquid film is flowing downwardly under the influence of gravity and it is unnecessary to provide mechanical means for spreading the liquid over the heated surface. The surface of the film-heating element is heated by means of a fluid-heating medium such as steam, oil and the like conducted into the hollow body of the element with suitable means for removal of the spent heating medium. Alternatively, electrical heating elements can be disposed on the interior of the said film heating element.

The above advantageous mode of flow of liquid film down the outer, heated surface of the film-heating element of the invention results from the novel construction of said element. The latter is composed of a plurality of hollow globular members which are mounted one above the other and interconnected by means of a series of hollow connecting members which have substantially vertical outer surfaces. By the term "globular members" I mean units which have a spherical, frustoconical, cylindrical, spheroidal or ellipsoidal outer configuration, i.e. units having external surfaces which are continuously curved or sloped in one or more directions. In general, the cross-sectional dimension of the various hollow globular members is substantially greater than that of the hollow connecting members. The hollow connecting members are advantageously tubular with the longitudinal axes aligned vertically and are each of a length which is substantially shorter than the vertical cross-sectional dimension of the hollow globular members to which they are attached. The interiors of the hollow globular members and the hollow connecting members are usually interconnecting so that they form a single vertically disposed film-heating element having a hollow passageway extending throughout the length thereof into which heating media can be conducted.

The liquid feed is introduced into the top of the outer shell of the evaporator and is conducted and distributed on to the top of the uppermost hollow globular member of the film-heating element by the employment of conventional distributing means such as a downwardly oriented funnel member discharging into a notched distributing weir. The liquid feed, after distribution on the top surface of the uppermost hollow globular member flows downwardly over the upper and then the lower surface of the said hollow globular member until said liquid reaches the junction of said hollow globular member and the outer vertical surface of the first of the hollow connecting members.

In the case of liquid feeds having relatively low viscosity this liquid flow pattern is aided by disposing a drip collecting apron, advantageously of frustoconical shape with the larger end uppermost, around the lower surface of said hollow globular member. Said tray is attached to, but spaced apart from the lower surface of the said hollow globular member at the junction of the latter with the hollow connecting member. The lower end of the apron is open so that any drip which may fall from the lower surface of the said hollow globular member is collected by said apron and flows down the inner surface thereof and is directed into a distributing weir, discussed hereinafter, at the top of the next globular member. This results in the reuniting of two liquid streams one of which has followed the contours of the lower surface of the hollow globular member and the other of which has fallen into the apron and flowed down the inner surface thereof.

In the case of relatively viscous liquid feeds said collecting trays are not generally necessary since such feeds follow the contours of said hollow globular member and show substantially no tendency to drip from the lower curved surface thereof.

Whether a collecting tray is employed or not the liquid film flowing around the lower surface of the hollow globular member reaches, or is directed on to, the upper surface of the hollow connecting member and flows vertically downward on to the upper surface of the next hollow globular member. To facilitate the distribution of the film on the surface of the said next hollow globular member a shallow distributor weir is disposed at the lower end of said hollow connecting member. Said distributor weir receives the downwardly-flowing liquid and causes even distribution of said liquid on to the upper surface of the next globular member.

The same arrangement of globular members, connecting members, distributor weirs, and, optionally, of drip-collecting aprons, is repeated down the length of the film-heating element. Accordingly, the above-described pattern of liquid film flow, with its alternate stretching and shrinking of the film, is repeated as the liquid passes down the film heating element. The undistilled liquid reaching the bottom of the heating element flows on to the bottom head of the outer shell of the apparatus and out through a conventional exit conduit.

The mode of construction and operation of the evaporator of the invention will now be further illustrated by reference to various specific embodiments.

In FIGURE 1 there is shown a schematic representation, taken in cross-section, of a falling film evaporator in accordance with one embodiment of the invention. In the evaporator of FIGURE 1 the outer shell 2 is substantially cylindrical in shape with the longitudinal axis thereof aligned in a vertical plane. The outer shell 2 is provided with a heating jacket 3; the source of heat therein is provided by hot fluids such as steam and the like, or by electrical heating means.

The base 2a of said outer shell 2, and the corresponding heating jacket 3a is detachably mounted to the remainder of said outer shell 2 by flange means 7. An inlet port 4 is provided in the upper part of the outer shell 2 for introduction of liquid feed which is to be subjected to heating and/or evaporation. The liquid feed is passed from the inlet port 4 to a downwardly distributing means 5 which, in the particular embodiment shown in FIGURE 1, takes the form of a funnel-shaped member having a curved edge 6 defining an annular passageway 8 around the top edge of funnel member 5 to facilitate preflashing of vapors from the feed. The annular passageway 8 has an opening 11 in the floor thereof, said opening 11 being formed between the inner edge of the lip 6 and the top of the conical portion of the funnel member 5. Fluid feed which is introduced through the port 4 flows around the annular member 8 and downwardly over the inner surface 12 of the funnel member 5. The falling fluid exits through the neck 14 of said funnel member into distributing weir 28 and, thence, overflows on to the top of the film-heating element 16.

The film-heating element 16 comprises, in the specific embodiment shown in FIGURE 1, a plurality of substantially spherical members 18 which are mounted one above the other in a vertical plane with the centers of said spheres aligned coaxially with the outer shell 2. Each of the substantially spherical members 18 is separated from, and joined to, its neighbor by means of a plurality of substantially cylindrical members 20. The latter cylindrical members are mounted with their longitudinal axes in a vertical plane aligned coaxially with the outer shell 2. The diameter of the cylindrical members 20 is substantially less than the diameter of the spherical members 18.

In the specific embodiment shown in FIGURE 1 all the spherical members 18 are of identical size and configuration as are all the cylindrical members 20. However, it will be appreciated by one skilled in the art that the diameter of the individual spherical members 18 can be varied as can the diameter of the various cylindrical members 20 to achieve different rates of flow and different surface areas of fluid at various levels in the film-heating element of the invention.

The interior of each of the spherical members 18 and of the cylindrical members 20 is hollow and, in this embodiment of the invention, there is a continuous passageway extending from the topmost spherical member 18 through the successive cylindrical members 20 and spherical members 18 downwardly through the column to the exit port 22 which leads from the film-heating element 16 to the outside of the apparatus of FIGURE 1. The existence of the hollow passageway extending the length of the film-heating element 16 enables heating media to be conducted into this element whereby the surface of each of the spherical members 18 and the cylindrical members 20 can be heated.

Figure 3:
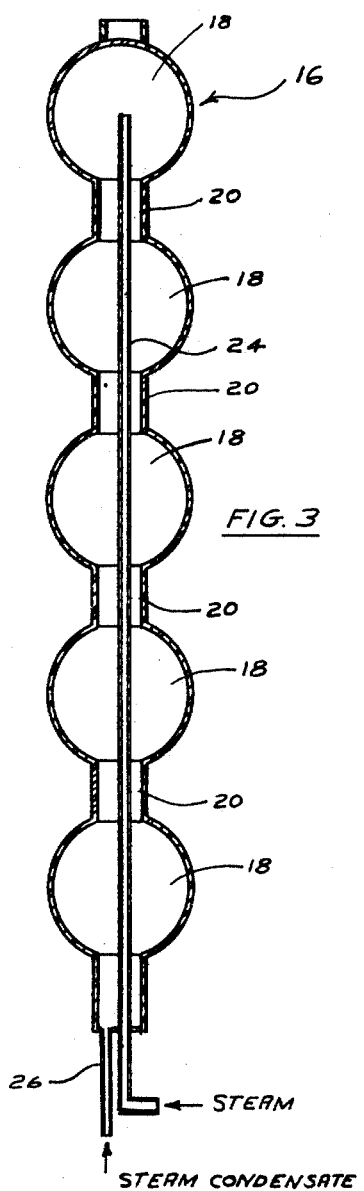
FIGURE 3 is a cross-sectional view taken along the vertical axis of the film heating element of the specific embodiment shown in FIGURE 1.

A specific embodiment of the internal heating means for the film-heating element 16 is shown in FIGURE 3. In said specific embodiment of FIGURE 3 the heating means comprises a pipe 24 which conducts a heating fluid such as steam from the outside of the film-heating element 16 up to the inner cavity of the topmost spherical member 18. An exit pipe 26 is provided at the base of the film-heating element 16 for the removal of non-condensed vapor and liquid condensate from the heating fluid. As will readily be apparent to one skilled in the art, other means of providing heat to the various surfaces of the film-heating element 16 can be adopted. Further, it is possible to provide, for example by a suitable arrangement of individual pipes into each of the spherical members 18, that the surfaces of the various spherical members 18 and the various cylindrical members 20 are at different temperatures such that there is a gradual change in surface temperature of the film-heating element 16 as one passes from the topmost spherical member 18 to the bottom member.

Turning again to the specific embodiment shown in FIGURE 1 the liquid feed which passes from the neck 14 of the funnel member 5 is received on to the top surface of the topmost spherical member 18 in an open distributing weir 28. From this weir 28 the fluid feed overflows through notches 30 in the outer edge of said weir 28. The overflowing fluid proceeding from the notches 38 falls on to the outersurface 32 of the topmost spherical member 18. The fluid then spreads and falls as a film under gravity over said surface 32 of the spherical member 18 and passes downwardly to the lower surface 34 of said topmost spherical member 18.

From the lower surface 34 of said spherical member 18 the fluid flows on to and vertically down the outer surface of the topmost cylindrical member 20 and is collected in distributor tray 34 which is mounted at, and encircles, the lower end of the cylindrical member 20. The fluid overflows from the distributor 38 and passes on to the upper surface of the sceond spherical member 18. The fluid then proceeds through the same flow path on the second spherical member 18 as that through which it passed on the first spherical member 18. Thus, the fluid flows down the upper and lower sides of the second spherical member 18 on the the next vertical connecting cylindrical member 20, downwardly over the surface of said cylinder and into and over the next corresponding distributor 42 on to the third spherical member 18. This sequence of flow is followed on each of the succeeding spherical members 18 and cylindrical members 20 each of which is provided with distributing weirs until the fluid finally arrives at the base of the last of the spherical members 18. At that point, in the specific embodiment of FIGURE 1, the remaining fluid is distributed from the notches of the final distributing weir 40 to a conically shaped splash plate 44 from which it overflows on to the heated inner surface of the base of the shell 2 and is removed from the shell via exit port 46.

Figure 2:
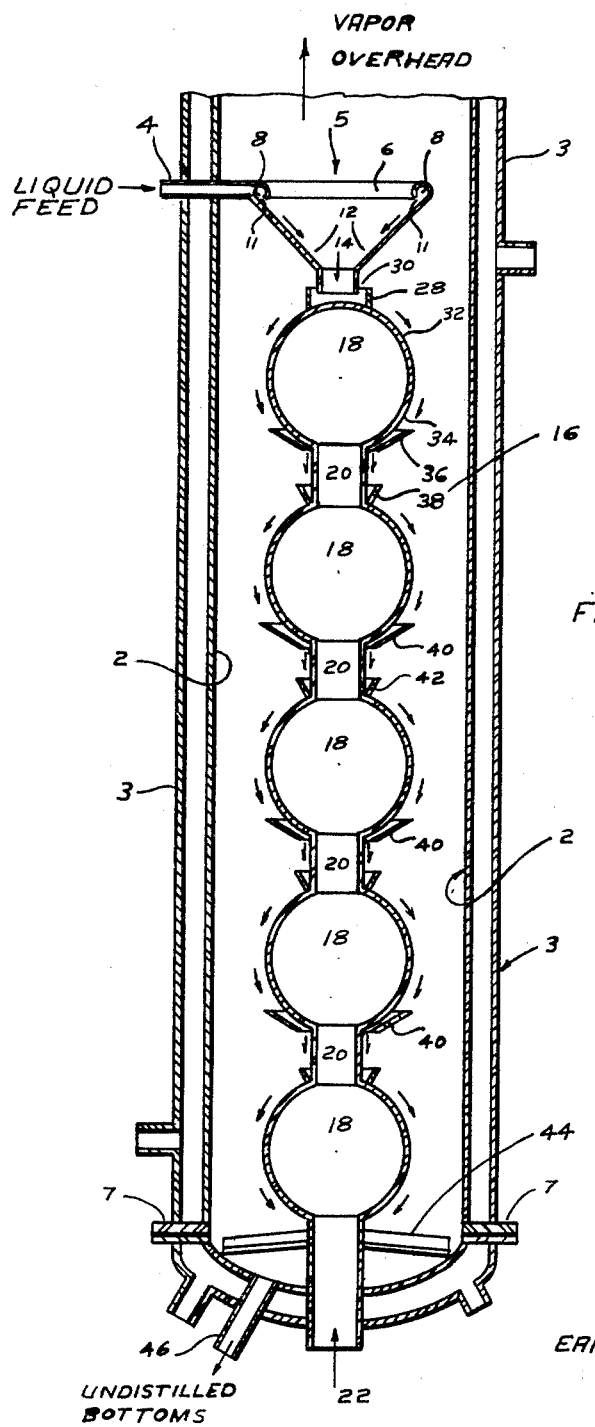
FIGURE 2 is a cross-sectional view taken along the vertical axis of a second specific embodiment of a falling film evaporator according to the invention.

The particular embodiment of FIGURE 1 is especially suited to the treatment of liquid feeds having reasonably good surface wetting tendency such as solutions of polyisocyanates in chlorinated aromatic hydrocarbon solvents. When using liquid feed materials of poor wetting tendency, or when danger of over-feeding is present, the specific embodiment of FIGURE 1 may require modification in order to prevent fluid falling free under gravity from the lower surface 34 of each globular member 18 directly on to the outer portion of the upper surface 32 of the next globular member without being collected in the distributing weir 38 and being redistributed over the entire upper surface of the next globular member. FIGURE 2 shows a modification of the specific embodiment of FIGURE 1 which is adapted for liquid feeds with low surface wetting tendency. In said modification of FIGURE 2 any of the downwardly-flowing fluid which might drip from the lower surface 34 of the topmost spherical member 18 and fall vertically towards the upper surface of the next lower spherical member 18 may be collected by means of the drip apron 36 which is disposed around the lower surface of the spherical member 18. Said apron 36 advantageously is frustoconical in configuration with the larger end disposed uppermost and the lower end disposed so that it is concentric with respect to the hollow member 16. The diameter of the uppermost end of the apron 36 need not be greater than the diameter of the spherical member 18, since any liquid, however fluid, will follow the lower surface 34 of the spherical member 18 for some distance before falling freely to said drip apron. The apron 36 is mounted at any convenient elevation so that the smaller end of the frustum drains into the distributing weir below it. Thus, any fluid which might drip from the lower surface of the spherical member 18 is collected and passed downwardly into the distributing weir below it. Each of the succeeding spherical members 18 in the embodiment of FIGURE 2 is provided with corresponding drip aprons 40.

In the specific embodiments of FIGURES 1 and 2 the total number of spherical members shown in the film heating element 16 is five and the total number of connecting cylindrical members is four. It will be readily appreciated by one skilled in the art that this number is shown merely for purposes of illustration and that a greater or lesser number of spherical and cylindrical units can be employed depending on the residence time and specific requirements of any particular process. Indeed, in a particular embodiment of an evaporator according to the invention the film-heating element comprises a single globular member such as the spherical member 18 mounted on a single connecting member such as the cylindrical member 20. In this particular embodiment the fluid film flows downwardly over the surface of the globular member, thence over the vertical walls of the connecting member and exits via a splash plate as in the previously described embodiments.

In the same way it will be understood by one skilled in the art that, although the geometric shape of the members 18 and the members 20 shown in the embodiment of FIGURES 1 and 2 is that of spheres and cylinders, respectively, the exact geometric shape of said members can be varied within wide limits without departing from the scope of the invention. For example, the member 18 which is shown as having spherical configurations in FIGURES 1 and 2 can assume a variety of other geometric configurations, the choice being dependent on a number of factors such as desired area of heating surface, required residence time of film on the heated surface, viscosity of the film, and the like.

Figure 4:
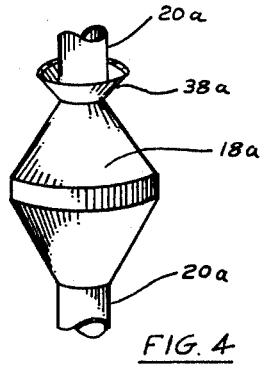
FIGURE 4 is a perspective view of a specific embodiment of a hollow globular member of a film heating element of an evaporator according to the invention.
Figure 5:
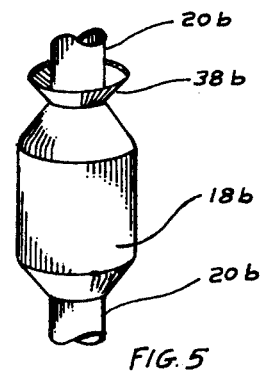
FIGURE 5 is a perspective view of another specific embodiment of a hollow globular member of a film heating element of an evaporator according to the invention.
Figure 6:
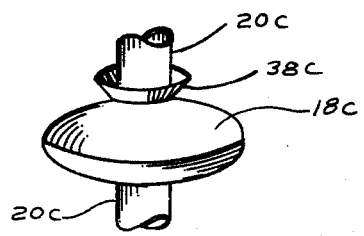
FIGURE 6 is a perspective view of yet another specific embodiment of a film heating element of an evaporator according to the invention.

Illustratively, the hollow globular member 18 instead of being spherical can take any of the configurations shown in FIGURES 4, 5 or 6. In FIGURE 4 the member 18a is shown, in a perspective partial view, as having upper and lower surfaces which are frustoconical, the two frustrums being joined at their wider ends and the surface of the junction being rounded. The distributor 38a in this embodiment is situated in corresponding position to the distributor 38 of the embodiment of FIGURE 1, namely, at the junction of the base of the cylindrical member 20a and the top of the member 18a.

In the variation shown in perspective partial view in FIGURE 5 the member 18b has the configuration of a cylinder with hemi-spherical surfaces at the upper and lower ends, the cylinder being aligned with the longitudinal axis vertical. The distributor 38a is positioned at the junction of the cylindrical member 20b and the member 18b as in the previous embodiments.

In the variation shown in perspective partial view in FIGURE 6 the member 18c has an ellipsoidal configuration with the longest axis thereof disposed horizontally. The distributor 38c is positioned at the junction of the cylindrical member 20c and the member 18c as in the previous embodiments.

Other spheroidal or ellipsoidal configurations, herein classified broadly as "globular," can be assumed by the member 18 with the limitation that the overall configuration of the member must permit a smooth flow of fluid over the outer surface with minimum tangential displacement or dripping of fluid from the under surface. Similarly, the cylindrical members 20, shown in FIGURES 1 and 2, can assume other geometric configurations provided that said configurations permit smooth flow of the fluid film substantially vertically downward over the surface of the member 20 into the tray 38 without any substantial dripping or tangential loss.

The overall dimensions of the film-heating element 16 and the relationship between the dimensions of this member and the dimensions of the outer shell 2 are not critical and can be readily adjusted to meet any particular operating requirements.

Figure 7:
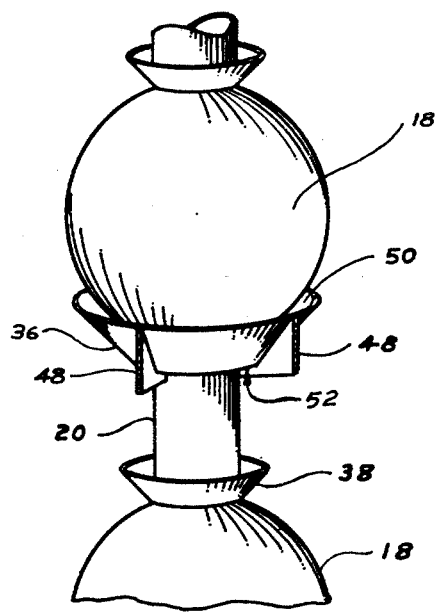
FIGURE 7 is a perspective view of a hollow globular member with surrounding tray of the specific embodiment shown in FIGURE 2.

One mode of mounting the drip aprons 36 shown in FIGURE 2, and the relationship of these aprons to the outer surface of the spherical members 18, is shown in more detail in a particular embodiment in FIGURE 7. In this embodiment the apron 36 is mounted on the cylindrical member 20 by means of a series of brackets 48 which are secured to the apron 36 and the member 20 by any suitable means such as screwing, welding, riveting and the like. The upper and lower ends of the drip apron 36 are spaced apart from the corresponding surfaces of the spherical member 18 and the cylindrical member 20 so that there is no interference by the drip apron with the liquid film flowing over the lower surface of the spherical member 18. It is to be understood that other modes of attachment of the drip apron 36 to the cylindrical member 20, i.e. when a drip apron is required, can be employed without in any way departing from the scope of the present invention.

The novel falling film evaporator of the invention can be employed in any separation of a relatively volatile liquid from a less volatile or non-volatile material and is particularly suited for the separation or stripping of solvents from relatively non-volatile solutes either at atmospheric pressure or under reduced pressure. For the reasons already discussed, the evaporator of the invention has marked advantages when employed in the stripping of solvent from solutions, for example, polyisocyanates in solvents such as chlorobenzene, which tend to deposit solid or gummy material during passage through the falling film evaporator. However, the range of application of the evaporator of the invention is by no means confined to the treatment of such fluids.

The novel evaporator of the invention has the advantages of simplicity of construction and ease of dismantling for cleaning and maintenance. The unique flow pattern of the liquid film over the film-heating element, with the alternate stretching and shrinkage of the film, greatly facilitates the escape of volatile material trapped in the film in addition to providing maximum unit surface area per unit of capacity. This increased efficiency permits the use of smaller temperature differences between the heating medium and heated film which in turn allows the use of lower film temperatures with consequent fall in amount of degradation of the heated material. The completely unrestricted area surrounding the film-heating element permits ready removal of volatile material from the evaporator and provides substantially zero pressure drop over the length of the apparatus. Accordingly, the evaporator can be operated more efficiently at lower pressures permitting use of lower film temperature with obvious advantages flowing therefrom.

While the novel apparatus of the invention has been described above with reference to certain specific embodiments thereof, it is to be clearly understood that these embodiments have been given for purposes of illustration only and are not intended to be limiting. The scope of the invention is bounded only by the scope of the claims which are set out hereafter.

I claim:
1. A falling film evaporator which comprises in combination:
  (i) an outer hollow shell having its longitudinal axis substantially vertically disposed;
  (ii) a liquid feed inlet disposed in the upper end of said outer shell;
  (iii) a hollow liquid film-heating element disposed within the said outer shell and comprising a series of superposed hollow spherical surfaces joined by hollow cylinders having substantially vertical exterior walls, said film-heating element being internally heated and the entire external surface thereof being wetted by liquid film;
  (iv) means disposed above the uppermost of said hollow spherical surfaces for receiving liquid from said liquid inlet in the upper end of said outer shell and distributing said fluid on the upper surface of said uppermost hollow spherical surface;
  (v) a plurality of distributor weirs disposed coaxially with and surrounding, the lower end of each of said hollow connecting members;
  (vi) means for removing volatile overhead from the upper end of said outer shell; and
  (vii) means for removing undistilled fluid bottoms from the lower end of said outer shell.

2. A falling film evaporator in accordance with claim 1 which also comprises a plurality of frustoconical collection aprons each of said aprons having the larger end uppermost and being disposed coaxially with respect to said hollow cylinders with the lower edge of each of said aprons surrounding, but being spaced apart from, the upper end of said hollow cylinders and defining a downwardly sloping fluid passageway between the lower outer surface of said hollow spherical surface and the inner surface of said apron.

3. A falling film evaporator comprising, in combination:
  (i) an outer hollow cylindrical shell having its longitudinal axis substantially vertically disposed;
  (ii) a liquid feed inlet disposed in the upper end of said outer shell;

(iii) a liquid film-heating element mounted substantially vertically within said outer shell and comprising a plurality of hollow spheres rigidly mounted one above the other each of said hollow spheres being connected with the interior of each of its neighbors by hollow cylindrical conduits having an exterior diameter less than the diameter of said spheres said film-heating element being internally heated and the entire external surface thereof being wetted by liquid film;

(iv) means disposed above the uppermost of said hollow spheres for receiving fluid from said liquid inlet in the upper end of said outer shell and for distributing said fluid on the upper surface of said uppermost hollow sphere;

(v) a plurality of frustoconical distributor weirs having their larger ends uppermost and disposed coaxially with and surrounding the lower end of each of said cylindrical conduits;

(vi) means for removing volatile overhead from the upper end of said outer shell; and (vii) means for removing undistilled fluid bottoms from the lower end of said outer shell.

4. A falling film evaporator in accordance with claim 5 which also comprises a plurality of frustoconical hollow collection aprons each of said aprons having the larger end uppermost and being disposed coaxially with respect to said cylindrical conduits the lower edge of each of said collection aprons surrounding, but being spaced apart from, the upper end of said cylindrical conduit and defining a downwardly sloping fluid passageway between the lower outer surface of said hollow sphere and the inner surface of said apron.

5. A falling film evaporator in accordance with claim 5 wherein the interior of each of said hollow spheres is heated independently of its neighbors.

References Cited

UNITED STATES PATENTS

| 161,353 | 3/1875 | Randon | 159—15 |
| 735,348 | 8/1903 | Deininger & André | 159—15 |
| 2,226,828 | 12/1940 | Moran | 202—236 X |

FOREIGN PATENTS

| 719 | 3/1856 | Great Britain |
| 424,990 | 5/1911 | France. |

NORMAN YUDKOFF, Primary Examiner

J. SOFER, Assistant Examiner

U.S. Cl. X.R.

159—28; 165—117

PO-1050
(5/69)

UNITED STATES PATENT OFFICE
CERTIFICATE OF CORRECTION

Patent No. 3,500,893          Dated March 17, 1970

Inventor(s) Earl E. McReynolds

It is certified that error appears in the above-identified patent and that said Letters Patent are hereby corrected as shown below:

Column 9, line 24: "Claim 5" should read --Claim 3--
Column 10, line 7: "Claim 5" should read --Claim 3--

SIGNED AND
SEALED
AUG 11 1970

(SEAL)
Attest:

Edward M. Fletcher, Jr.
Attesting Officer

WILLIAM E. SCHUYLER, JR.
Commissioner of Patents